(12) United States Patent
Reso et al.

(10) Patent No.: US 9,153,203 B2
(45) Date of Patent: Oct. 6, 2015

(54) TEMPORALLY CONSISTENT SUPERPIXELS

(71) Applicant: THOMSON LICENSING, Issy de Moulineaux (FR)

(72) Inventors: Matthias Reso, Hannover (DE); Joern Jachalsky, Wennigsen (DE); Bodo Rosenhahn, Ronnenberg (DE)

(73) Assignee: THOMSON LICENSING, Issy les Moulineaux (FR)

( * ) Notice: Subject to any disclaimer, the term of this patent is extended or adjusted under 35 U.S.C. 154(b) by 138 days.

(21) Appl. No.: 13/925,374

(22) Filed: Jun. 24, 2013

(65) Prior Publication Data
US 2013/0342559 A1    Dec. 26, 2013

(30) Foreign Application Priority Data
Jun. 26, 2012    (EP) .................................... 12305744

(51) Int. Cl.
*G09G 5/02*    (2006.01)
*G06T 7/00*    (2006.01)

(52) U.S. Cl.
CPC ................ *G09G 5/02* (2013.01); *G06T 7/0081* (2013.01); *G06T 2207/10016* (2013.01); *G06T 2207/10024* (2013.01)

(58) Field of Classification Search
CPC ................... G09G 3/3607; G09G 2300/0439; G06T 7/0081; G06T 2207/10024; G06K 9/4652; G06K 9/6212; G06K 9/6218; G06K 9/6267; G06F 17/3025
See application file for complete search history.

(56) References Cited

U.S. PATENT DOCUMENTS 7,747,075 B2    6/2010    Tian
2002/0027561 A1    3/2002    Wu
2011/0286635 A1    11/2011    Nishigaki

OTHER PUBLICATIONS

Y. Deng and B. S. Manjunath, "Unsupervised segmentation of color-texture regions in images and video," IEEE Trans. Pattern Anal. Machine Intell., vol. 23, pp. 800-810, Aug. 2001.*
Radhakrishna Achanta et al_SLIC Superpixels_EPFL Technical Report 149300_Jun. 2010_retrieved infoscience. epfl_ XP002712355.ch.
Shu Wang et al_Superpixel tracking_Computer Vision ICCV,, IEEE, Nov. 6, 2011_XP032101338.
X. Ren and J. Malik, "Learning a classification model for segmentation," presented at the Computer Vision (ICCV), 2003. IEEE International Conference on, 2003, pp. 10-17.
A. Levinshtein, A. Stere, K. N. Kutulakos, D. J. Fleet, S. Dickinson, and K. Siddiqi, "TurboPixels: Fast Superpixels Using Geometric Flows," Pattern Analysis and Machine Intelligence, IEEE Transactions on, vol. 31, No. 12, pp. 2290-2297, 2009.
O. Veksler, Y. Boykov, and P. Mehrani, "Superpixels and Supervoxels in an Energy Optimization Framework," in Computer Vision—ECCV 2010, vol. 6315, K. Daniilidis, P. Maragos, and N. Paragios, Eds. Springer Berlin / Heidelberg, 2010, pp. 211-224.
A. P. Moore, S. J. D. Prince, J. Warrell, U. Mohammed, and G. Jones, "Superpixel lattices," presented at the Computer Vision and Pattern Recognition (CVPR), 2008. IEEE Conference on, 2008, pp. 1-8.

(Continued)

*Primary Examiner* — Antonio A Caschera

(57) ABSTRACT

A method and an apparatus for generating superpixels for a sequence of frames are presented. A feature space of the sequence of frames is separated into a color subspace and a spatial subspace. A clustering is then performed that comprises iterative assigning and updating.

3 Claims, 5 Drawing Sheets

(56) References Cited

OTHER PUBLICATIONS

A. Levinshtein, C. Sminchisescu, and S. Dickinson, "Spatiotemporal Closure," in Computer Vision—ACCV 2010, vol. 6492, R. Kimmel, R. Klette, and A. Sugimoto, Eds. Berlin, Heidelberg: Springer Berlin / Heidelberg, 2011, pp. 369-382.

M. Van den Bergh and L. Van Gool, "Real-time stereo and flow-based video segmentation with superpixels," presented at the Applications of Computer Vision (WACV), 2012 IEEE Workshop on, 2012, pp. 89-96.

R. Achanta, A. Shaji, K. Smith, A. Lucchi, P. Fua, and S. Susstrunk, "SLIC Superpixels Compared to State-of-the-art Superpixel Methods," Pattern Analysis and Machine Intelligence, IEEE Transactions on, vol. PP, No. 99, pp. 1-1, 2012.

Hu_et al_Incremental tensor subspace learning and its applications to foreground segmentation and tracking; Publication Date: Feb. 1, 2011 Authors: Weiming Hu Xi Li Xiaoqin Zhang Xinchu Shi Maybank, S. Zhongfei ZhangOrganization: Nat. Lab. of Pattern Recognition, Chinese Acad. of Sci., Beijing | Coll. of Math. & Inf. Sci., Wenzhou Univ., Wenzhou | Dept. of Comput. Sci. & Inf. Syst., Birkbeck Coll., London | State Univ. of New York, Binghamton, NYSOURCE: International Journal of Computer Vision | vol. 91, No. 3 | 303-27 | Feb. 2011Publisher: Springer Netherlands.

Figueira_etal_Optical flow based detection in mixed human robot environments; Publication Date: Dec. 30, 2009Authors: Figueira, D. Moreno, P. Bernardino, A. Gaspar, J. Santos-Victor, J. Bebis, G. Boyle, R. Parvin, B. Koracin, D. Kuno, Y. Junxian Wang Pajarola, R. Lindstrom, P. Hinkenjann, A. Encarnacao, M.L. Silva, C.T. Corning, D.Organization: Inst. Super. Tecnico & Inst. de Sist. e Robot., LisbonSource: Advances in Visual Computing. Proceedings 5th International Symposium, ISVC 2009 | 223-32 | 2009Publisher: Springer Verlag.

Moll_etal_4D cardiac segmentation of the epicardium and left ventricle; Publication Date: Sep. 7, 2009Authors : Moll, G.P. Tadmor, G. MacLeod, R.S. Rosenhahn, B. Brooks, D.H. Dossel, O. Schlegel, W.C. Organization : Inst. fur Informationsverarbeitung (TNT), Leibniz Univ., Hannover | Dept. of Electr. & Comput. Eng., Northeastern Univ., Boston, MA | Nora Eccles Harrison Cardiovascular Res. & Training Inst. (CVRTI), Univ. of Utah, Salt Lake City, UT | Inst. Biomed. Tech., Univ. Karlsruhe, Karlsruhe | Abt. Med. Phys. in der Strahlentherapie, Deutsche Krebsforschungszentrum (DKFZ), HeidelbergSource: 11th International Congress of the IUPESM. World Congress on Medical Physics and Biomedical Engineering. Image Processing, Biosignal Processing, Modelling and Simulation, Biomechanics | Jul. 2004 | 2009Publisher: Springer Verlag.

Achanta et al.: SLIC Superpixels; EPFL Technical Report 149300, Jun. 2010.

\* cited by examiner

```
01: Initialize cluster centers c_k and s_1,k by sampling frame 1 at a
    regular grid with step size S
02: Shift cluster centers in an m x m neighborhood towards the lowest
    gradient
03: for M_1 times do
04:     for each cluster centers c_k and s_1,k do
05:         Assign the pixels inside the search window around the cluster
            center to the center with the smallest distance dist(i,1,k)
06:     end
07:     Compute new cluster centers by calculating mean color and image
        coordinate of the assigned pixels
08: end
09: repeat
10:     expand sliding window by one frame
11:     predict spatial centers of newly added frame by averaging the
        optical flow vectors of pixels assigned to the corresponding
        superpixel of last added future frame
12:     for M_2 times do
13:         for each superpixel k do
14:             for each present and future frame j do
15:                 Assign the pixels inside the search window around the
                    cluster center to center with the smallest distance
                    dist(i,j,k)
16:             end
17:         end
18:         Compute new color cluster centers by calculating mean color of
            the assigned pixels over all present and future frames
19:         Compute new spatial centers by calculating mean image
            coordinate of assigned pixels on all frames separately
20:     end
21: until F future frames have been added
22: repeat
23:     shift sliding window by one frame
24:     when P past frames exist save pixel-assignment of the last frame
        that left the sliding window
25:     predict spatial center on newly added frame by averaging the
        optical flow vectors of pixels assigned to the corresponding
        superpixel of last added future frame
26:     for M_3 times do
27:         for each superpixel k do
28:             for each present and future frame j do
29:                 Assign the pixels inside the search window around the
                    cluster center to center with the smallest distance
                    dist(i,j,k)
30:             end
31:         end
32:         Compute new color cluster centers by calculating mean color of
            the assigned pixels over all past, present and future frames
33:         Compute new spatial centers by calculating mean image
            coordinate of assigned pixels on all present and future frames
            separately
34:     end
35: until sliding window reaches end of the image cube
```

Fig. 5

TEMPORALLY CONSISTENT SUPERPIXELS

This application claims the benefit, under 35 U.S.C. §119 of European Patent Application 12305744.0, filed Jun. 26, 2012.

FIELD OF THE INVENTION

The invention relates to the generation of superpixels for image processing, image analysis, and region segmentation. More specifically, the invention addresses the temporal consistency of superpixels generated on video sequences.

BACKGROUND OF THE INVENTION

Superpixel algorithms represent a very useful and increasingly popular preprocessing step for a wide range of computer vision applications, such as segmentation, image parsing, classification etc. Grouping similar pixels into so called superpixels leads to a major reduction of the image primitives. This results in an increased computational efficiency for subsequent processing steps, allows for more complex algorithms computationally infeasible on pixel level, and creates a spatial support for region-based features.

Superpixel algorithms group pixels into superpixels. As indicated in X. Ren et al.: "*Learning a classification model for segmentation*", IEEE International Conference on Computer Vision (ICCV) 2003, pp. 10-17, superpixels are local, coherent, and preserve most of the structure necessary for segmentation at scale of interest. As further stipulated in the above document, superpixels should be roughly homogeneous in size and shape. Though many superpixel approaches mostly target still images and thus provide only a limited or no temporal consistency at all when applied on video sequences, some approaches target video sequences. See, for example, O. Veksler et al.: "*Superpixels and Supervoxels in an Energy Optimization Framework*", in Computer Vision—ECCV 2010, vol. 6315, K. Daniilidis et al., Eds. Springer Berlin/Heidelberg, 2010, pp. 211-224, or A. Levinshtein et al.: "*Spatiotemporal Closure*", in Computer Vision—ACCV 2010, vol. 6492, R. Kimmel et al., Eds. Springer Berlin/Heidelberg, 2011, pp. 369-382. These approaches start to deal with the issue of temporal consistency.

SUMMARY OF THE INVENTION

It is an object of the present invention to propose a solution for generating superpixels for a sequence of frames, which achieves an improved temporal consistency of the superpixels.

According to the invention, a method for generating superpixels for a sequence of frames comprises the steps of:
  separating a feature space of the sequence of frames into a color subspace and a spatial subspace;
  performing a clustering in the spatial subspace on a frame basis; and
  performing a clustering in the color subspace on stacked frames.

Accordingly, an apparatus for generating superpixels for a sequence of frames is adapted to perform the above steps. For this purpose the apparatus has a feature space separator for separating a feature space of the sequence of frames into a color subspace and a spatial subspace. Furthermore, the apparatus has a first cluster generator for performing a clustering in the spatial subspace on a frame basis and a second cluster generator for performing a clustering in the color subspace on stacked frames.

Also, computer readable storage medium has stored therein instructions enabling generating superpixels for a sequence of frames, which when executed by a computer, cause the computer to:
  separate a feature space of the sequence of frames into a color subspace and a spatial subspace;
  perform a clustering in the spatial subspace on a frame basis; and
  perform a clustering in the color subspace on stacked frames.

The proposed solution leverages optical flow information and applies a pixel clustering in the image cube, i.e. the stacked images, instead of a clustering in single images. For the clustering in the image cube the original 5D feature space is separated into the color subspace and the spatial subspace, i.e. the pixel coordinates within a frame. The clustering in the color subspace is done on the image cube and the clustering in the spatial subspace is done on frame level.

Leveraging optical flow information increases the temporal robustness, allowing to handle even fast motion in scenes, and reduces the search window size. A so called "tube" within the image cube is created. This tube comprises all the search windows in the subsequent frames forming the image cube.

The solution significantly improves the temporal consistency of superpixels generated on video sequences and hence results in high quality superpixels. This is a key enabler for temporally consistent results of subsequent processing steps or computer vision applications relying on superpixels.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims. In the figures:

FIG. 5 depicts an algorithm in pseudo code implementing update and assignment procedures as well as an initialization.

DETAILED DESCRIPTION OF PREFERRED EMBODIMENTS

Figure 1:
FIG. 1 shows an image to be segmented into superpixels.
Figure 2:
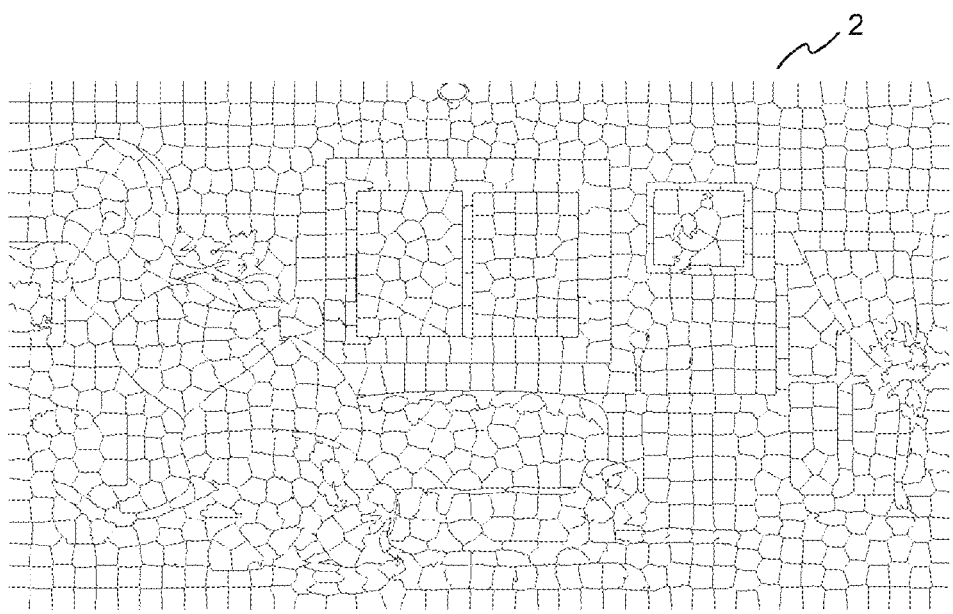
FIG. 2 depicts a boundary map obtained for the image of FIG. 1.
Figure 3:
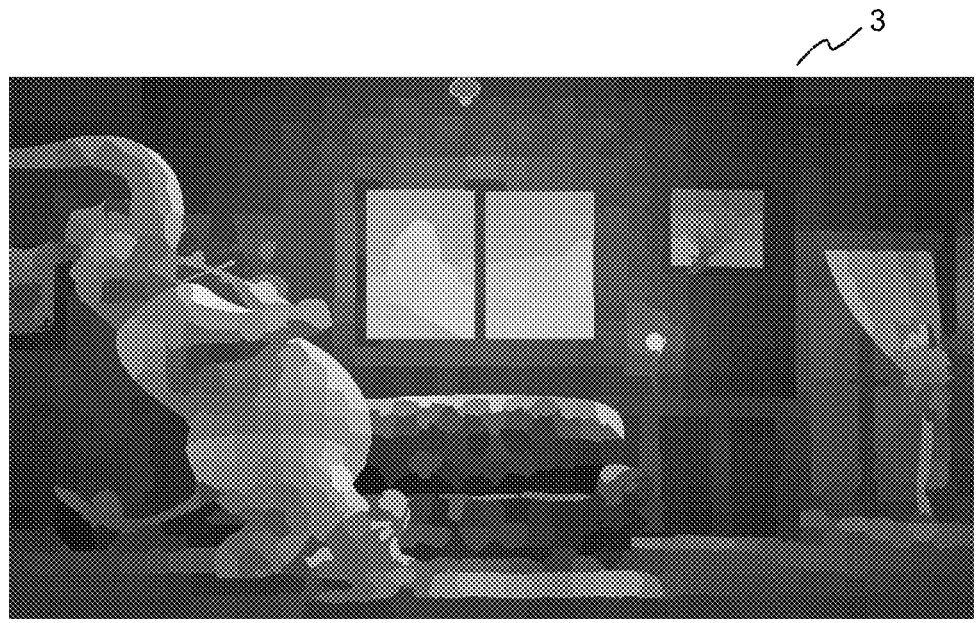
FIG. 3 shows a segmentation map obtained for the image of FIG. 1 based on the boundary map of FIG. 2.

FIGS. 1 to 3 show an example of a segmentation of an image into superpixels. FIG. 1 depicts the original image 1. A boundary map 2 generated for the image 1 is shown in FIG. 2. The boundary map 2 is an array that illustrates the probability that a semantically meaningful boundary is present between two pixels of the image. In the simplest case the array is the binary output of an edge detector. However, more complicated schemes may be used to obtain more reliable boundary maps. FIG. 3 depicts the segment map 3 obtained for the image 1 based on the boundary map 2. The grey value of each segment is set to the average grey value of the corresponding area of the original image 1.

Figure 4:
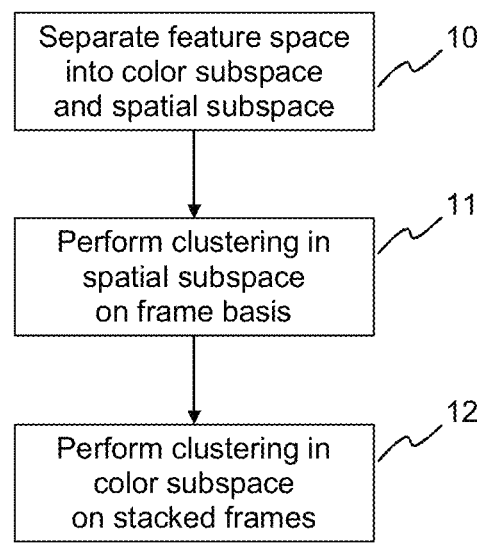
FIG. 4 schematically illustrates a flowchart of a method according to the invention.

A method according to the invention for generating superpixels for a sequence of frames is schematically illustrated in FIG. 4. In a first step a feature space of the sequence of frames is separated 10 into a color subspace and a spatial subspace. In the spatial subspace clustering 11 is then performed on a frame basis, whereas in the color subspace clustering 12 is performed on stacked frames.

The present solution allows the generation of temporally consistent superpixels on subsequent frames of videos. The term 'temporally consistent superpixel' here means meant that for each superpixel the corresponding instances in all other frames are known and that those superpixels comprise corresponding pixels in the frames.

The proposed approach is an extension of the basic idea found in R. Achanta et al.: "*SLIC Superpixels*", EPFL Technical Report 149300, June 2010, which describes the generation of superpixels on still images by clustering in a five-dimensional space. The segmentation of the frames into superpixels is based on color similarity and spatial proximity. In contrast to the work by R. Achanta et al. the current approach works not on a single still image but on a sequence of J images pooled in an image cube or stack.

Every single pixel i of an image j that is part of the image cube can be seen as a point in a five-dimensional [labxy] space where [lab] are the three dimensions of CIELAB color space and [xy] are the image coordinates. In the work by CIELAB every single image of the image cube would have an independent 5D space. In contrast to that the present approach joins the three color dimensions [lab] of all pixels of the image cube into one three dimensional joint color space. This is possible as the colors of pixels belonging to the same superpixel are expected to be similar in subsequent frames of the image cube. As this does not hold for the location of superpixel instances in different frames, the spatial dimensions [xy] are treated as independent for every image in the image cube.

In the above article every superpixel is represented by a cluster center, which corresponds to a point in the 5D space.

However, as according to the present solution color and spatial dimensions are treated in different ways, the cluster centers of the K superpixels have to be extended. Every superpixel k is represented by one color center $c_k = [l_k a_k b_k]^T$ that is valid for all frames and furthermore a separate spatial center $S_{j,k} = [x_{j,k} y_{j,k}]^T$ for every single frame j.

The distance of a pixel i in frame j to the cluster center of superpixel k can be calculated by $$dist(i, j, k) = d_{lab} + \frac{m}{S} \cdot d_{xy}. \quad (1)$$

where the scaling factor $$\frac{m}{S}$$

normalizes the spatial distance $d_{xy}$ into the range of the color distance $d_{lab}$. The parameter m controls the compactness of the superpixels, and $$S = \sqrt{\frac{N}{K}},$$

where N is the number of pixels in a frame and K is the number of superpixels.

The color distance can be calculated with respect to the color center of the k's superpixel:

$$d_{lab} = \sqrt{((l_k - l_{i,j})^2 + (a_k - a_{i,j})^2 + (b_k - b_{i,j})^2)}. \quad (2)$$

The spatial distance has to be calculated with respect to the spatial center of the k's superpixel in the corresponding frame j:

$$d_{xy} = \sqrt{((x_{j,k} - x_{i,j})^2 + (y_{j,k} - y_{i,j})^2)}. \quad (3)$$

For minimizing the computational effort the approach described by R. Achanta et al. uses a search window of 2S×2S around the spatial cluster center. As the present approach operates on an image cube this local search window is extended into the temporal dimension by creating a search window on every frame centered around the spatial cluster center $s_{j,k}$. This can be seen as a search tube winding through the image cube.

A sliding window or sliding tube approach is used to allow the color of a superpixel to change in the long term. The sliding window is spanned around a center frame, also called the present frame. Before and after the present frame there can be up to P past frames and F future frames that are successive and direct neighbors of the present frame. When the sliding window is shifted by one frame a new frame enters the window and the oldest future frame becomes the present frame. At the same time the present frame becomes the youngest past frame and the oldest past frame leaves the sliding window.

For real-time applications, were no future frames are available, they can be emulated by delaying the video stream to achieve this look-ahead.

The segmentation into superpixels uses a localized k-means approach with a special initialization sequence and special update and assignment procedures as more than one frame is involved. The update and assignment procedures as well as the initialization are described in FIG. 2, which depicts a corresponding algorithm.

In addition, as in the work by R. Achanta et al. a so called EnforceConnectivity step is applied.

It should be noted that the assignments are only changed for the current and future frames, not for the past frame. Thus, the past frames have a "conservative behavior".

Figure 6:
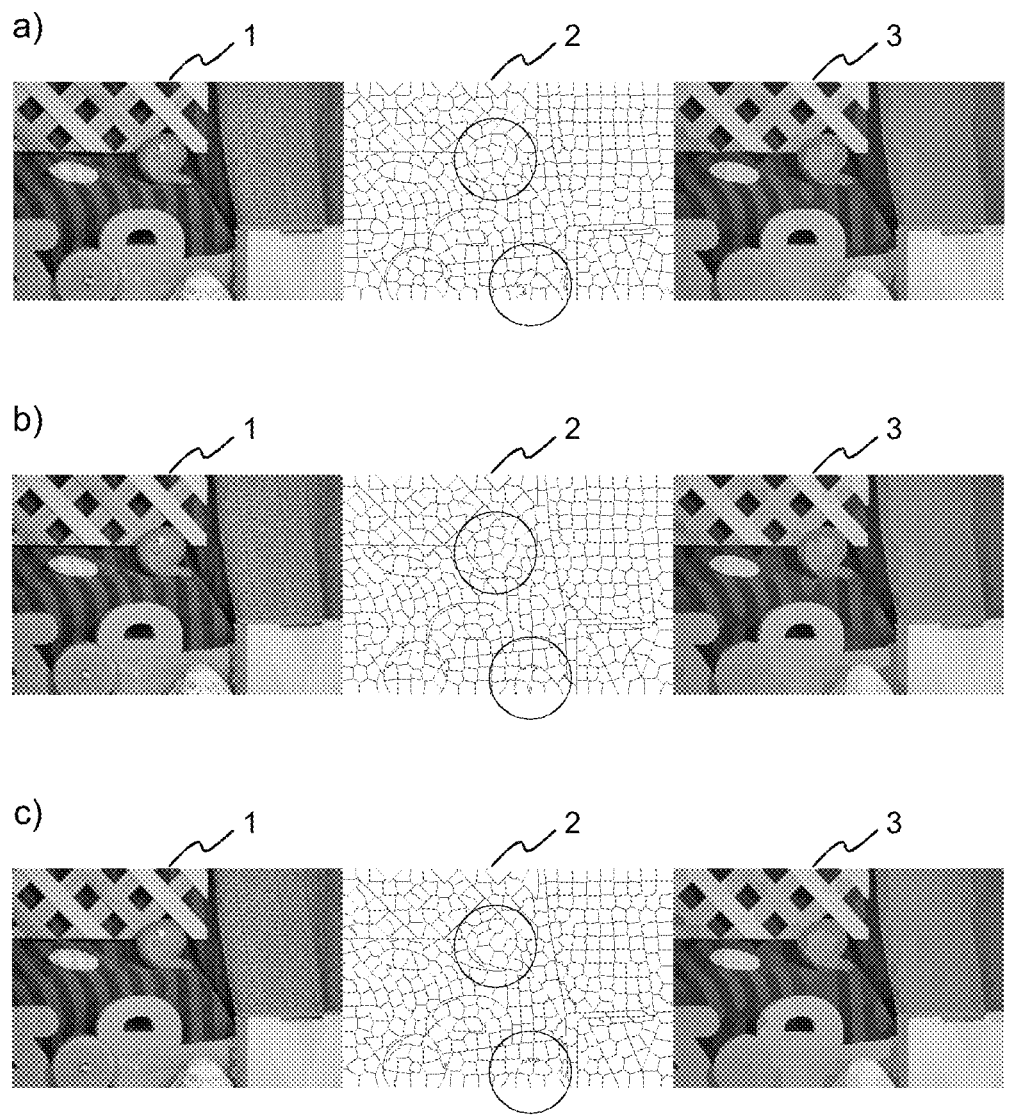
FIG. 6 shows a sequence of frames and the corresponding boundary maps and segmentation maps without temporal consistency.
Figure 7:
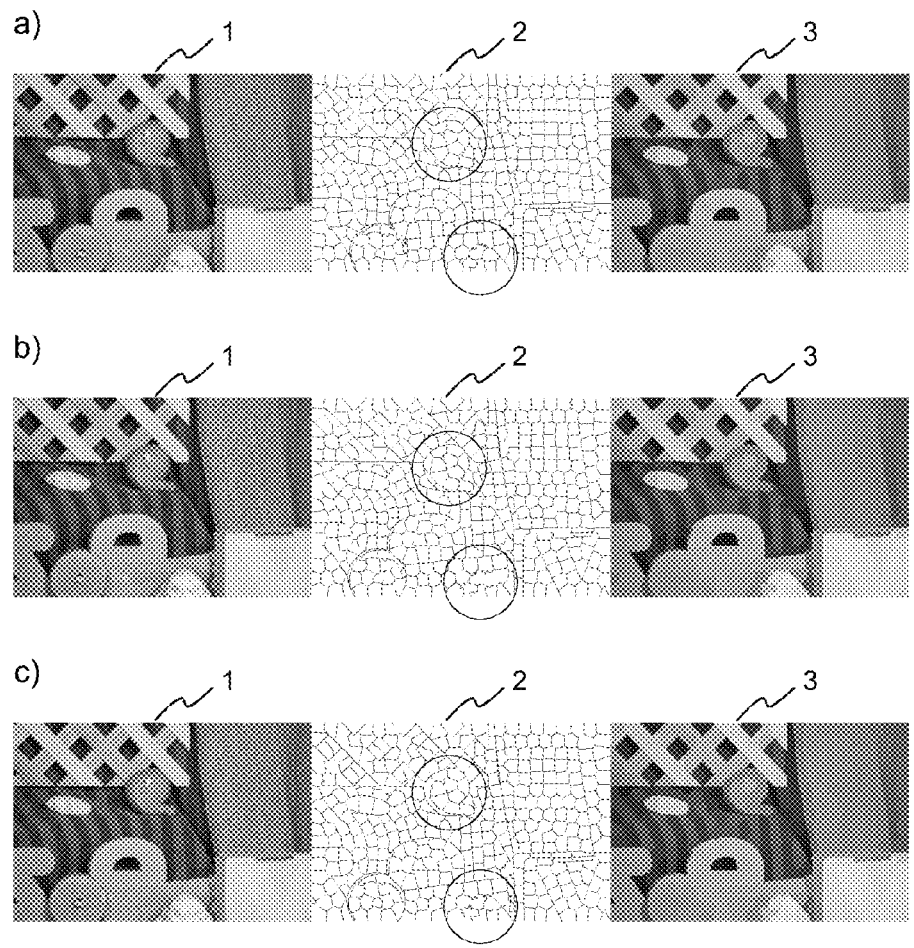
FIG. 7 shows the same sequence of frames as FIG. 6 and the corresponding boundary maps and segmentation maps with temporal consistency.

In order to illustrate how the proposed solution improves the temporal consistency of the superpixels of subsequent frames, FIGS. 6a) to c) show a sequence of frames 1 and the corresponding boundary maps 2 and segmentation maps 3 obtained without using the proposed solution. FIGS. 7a) to c) show the same sequence of frames 1 and the corresponding boundary maps 2 and segmentation maps 3. However, in this case the proposed solution is used. The differences are best visible in the boundary maps, especially in the area corresponding to the rubber whale in the center of the frames and the shell in the bottom center of the frames. As can be seen, in FIGS. 6a) to c) the identified boundaries for these objects (highlighted by the solid circles) change significantly between the frames, whereas they are rather stable in FIGS. 7a) to c). It can also be seen from the segments maps 3 that the superpixels are a useful tool for assessing the structure of a scene.

Figure 8:
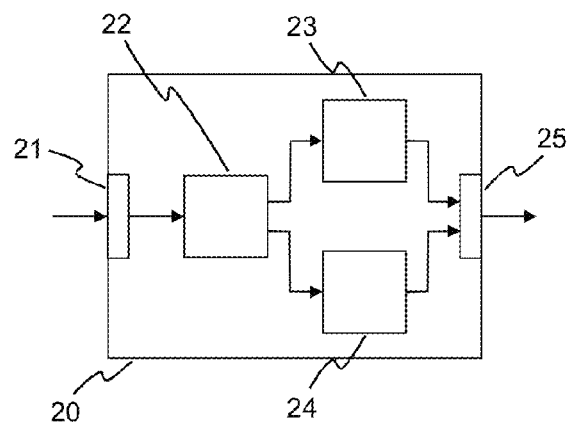
FIG. 8 schematically illustrates an apparatus according to the invention for generating superpixels for a sequence of frames.

FIG. 8 schematically illustrates an apparatus 20 according to the invention for generating superpixels for a sequence of frames. The apparatus 20 comprises an input 21 for receiving a sequence of frames. A separator 22 separates 10 a feature space of the sequence of frames into a color subspace and a spatial subspace. A spatial clustering unit 23 performing a clustering 11 in the spatial subspace on a frame basis. A color clustering unit 24 performs a clustering 12 in the color subspace on stacked frames. The results of the clustering operations 11, 12 are made available at an output 25. Of course, the different elements of the apparatus 20 may likewise be combined into a single dedicated processing unit. The may also be implemented as software running on a processor.

What is claimed, is:

1. A method implemented in an apparatus for generating superpixels for a sequence of frames, the method comprising:
   receiving a sequence of frames via an input;
   separating a feature space of the sequence of frames into a color subspace and a spatial subspace with a separator;
   performing a clustering with a clustering hardware unit, the clustering comprising iteratively assigning and updating, wherein the assigning uses joint distances derived from a distance to spatial cluster centers determined in the spatial subspace on a frame basis and a distance to color cluster centers determined in the color subspace on stacked frames, wherein a search window associated with a cluster is extended into the temporal dimension by creating a window on every frame centered around a spatial cluster center in that frame, the search window being a sliding window spanned around a center frame, and wherein in the updating, updated spatial cluster centers and color cluster centers are computed based on results of the assigning; and
   outputting results of the clustering via an output.

2. An apparatus for generating superpixels for a sequence of frames, wherein the apparatus comprises:
   an input configured to receive a sequence of frames;
   a processing unit configured to separate a feature space of the sequence of frames into a color subspace and a spatial subspace and to perform a clustering comprising iterative assigning and updating, wherein the assigning uses joint distances derived from a distance to spatial cluster centers determined in the spatial subspace on a frame basis and a distance to color cluster centers determined in the color subspace on stacked frames, wherein a search window associated with a cluster is extended into the temporal dimension by creating a window on every frame centered around a spatial cluster center in that frame, the search window being a sliding window spanned around a center frame, and the updating updates spatial cluster centers and color cluster centers based on results of the assigning; and
   an output configured to output results of the clustering.

3. A non-transitory computer readable storage medium having stored therein instructions enabling generating superpixels for a sequence of frames, which when executed by a processor, cause the processor to:
   separate a feature space of the sequence of frames into a color subspace and a spatial subspace; and
   perform a clustering using the processor comprising iteratively assigning and updating, wherein the assigning uses joint distances derived from a distance to spatial cluster centers determined in the spatial subspace on a frame basis and a distance to color cluster centers determined in the color subspace on stacked frames, wherein a search window associated with a cluster is extended into the temporal dimension by creating a window on every frame centered around a spatial cluster center in that frame, the search window being a sliding window spanned around a center frame, and wherein in the updating, updated spatial cluster centers and color cluster centers are computed based on results of the assigning.

* * * * *